Figure 1:
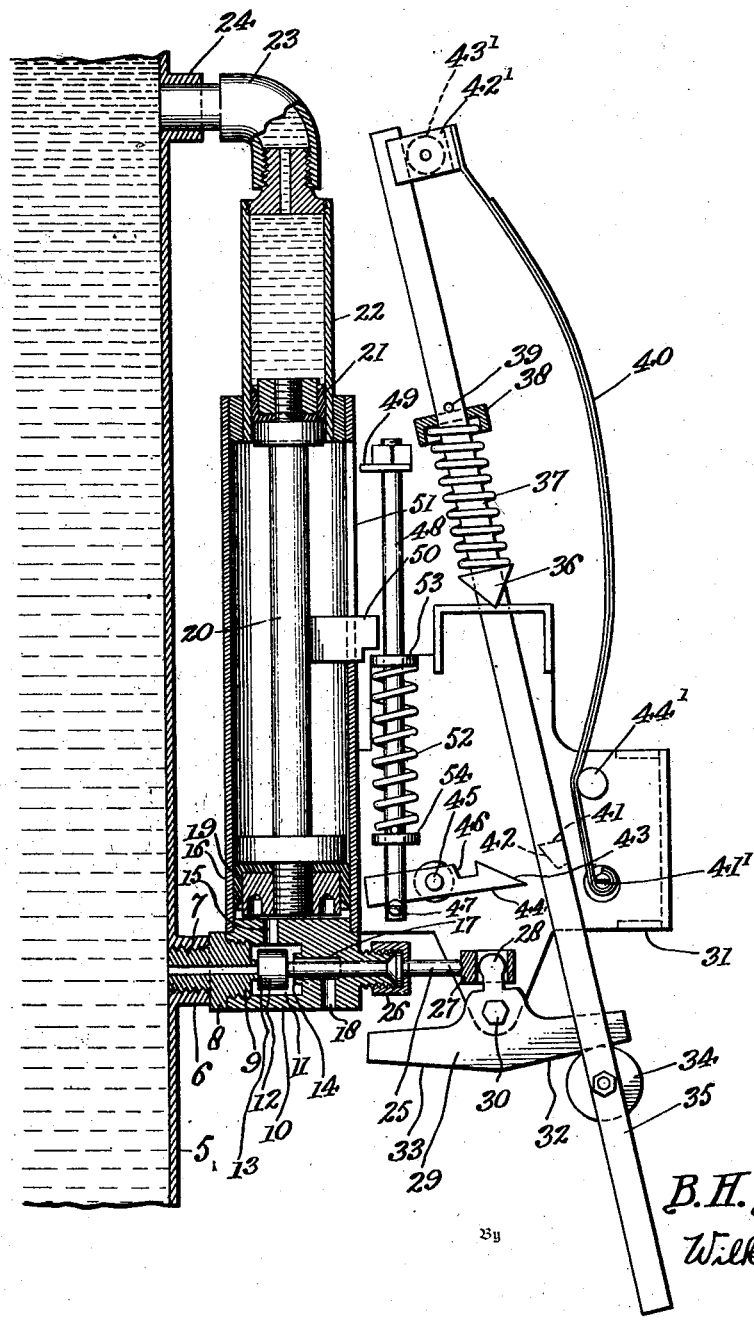

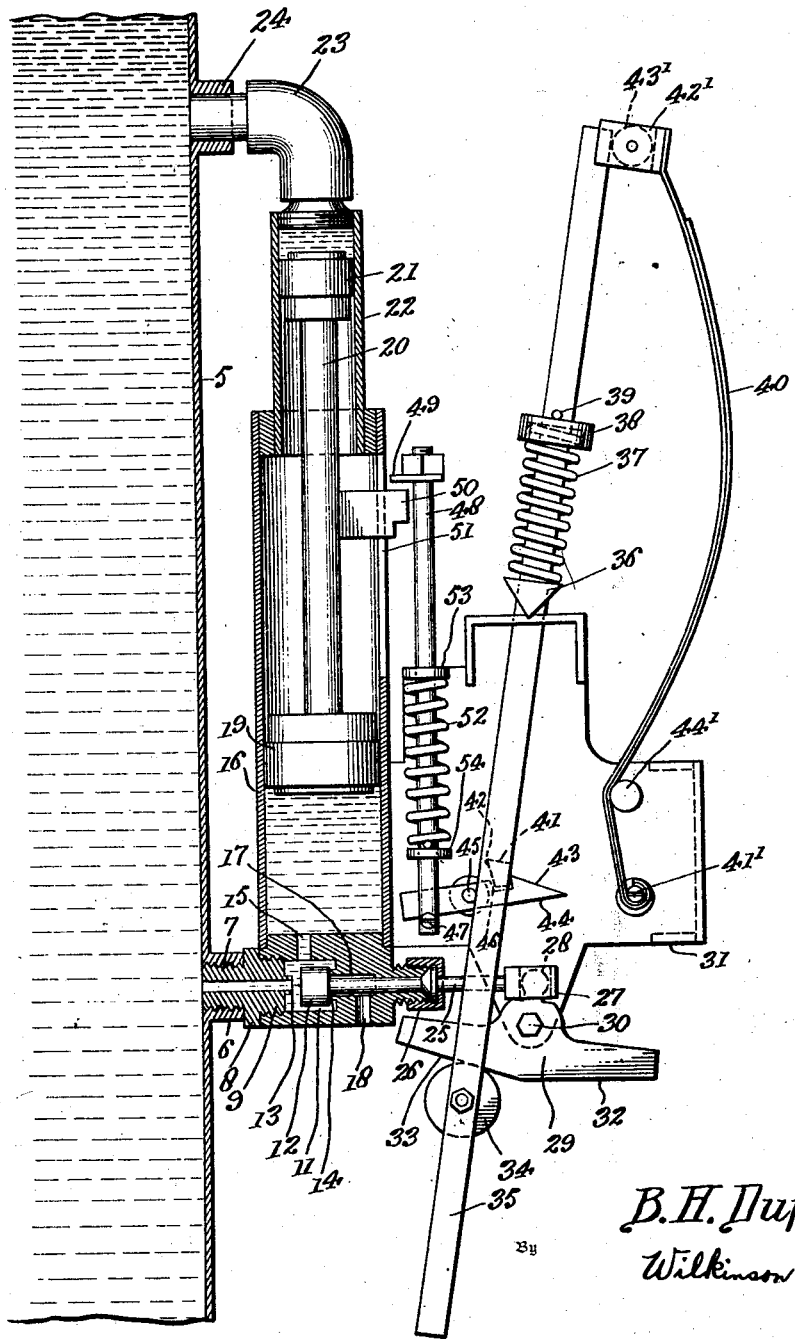

Patented July 1, 1930

1,769,499

UNITED STATES PATENT OFFICE

BENJAMIN H. DUPUY, OF NEW ORLEANS, LOUISIANA

AUTOMATIC LIQUID-MEASURING DEVICE

Application filed June 1, 1929. Serial No. 367,662.

The present invention relates to improvements in automatic liquid measuring device, and has for an object to provide an improved device, whereby a predetermined quantity of liquid may be removed from a tank or vessel under pressure.

Another object of the invention is to provide an improved measuring device, in which a precise quantity of liquid may be faithfully delivered at each actuation of the device.

A further object of the invention resides in providing a simple, compact and reliably performing and delivering apparatus for measuring liquids from closed or other tanks, or vessels.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation with parts shown in section, and parts broken away, of an improved automatic liquid measuring device constructed according to the present invention and shown in one position, and Figure 2 is a similar view with the parts, shown in a subsequent position.

Referring more particularly to the drawings, 5 represents a closed or other tank or vessel for containing liquid, which is adapted to be dispensed in measured quantities, and 6 represents an outlet neck for the tank. This outlet may be internally threaded to receive the externally threaded nipple 7 by which the connection is made to the lower portion of the measuring apparatus. The neck 7 is provided with a nut 8 for taking against the neck 6, and with a forwardly projecting externally threaded extension part 9, which is threaded into one side of the base 10.

The base is provided with a chamber 11 containing a reciprocating valve 12 adapted to move back and forth between the valve seats 13 and 14. The chamber 11 communicates through a port 15 with the interior of the cylinder 16, which rests upon the base 10, and which may be affixed thereto in any appropriate manner. The valve chamber 11 also communicates with the atmosphere through a passage 17 and a vent 18.

In the cylinder 16 is a plunger or piston 19 carried by the lower end of a plunger rod 20, which is affixed at its upper end to a second piston 21 of smaller diameter compared with the lower piston 19. The upper smaller piston 21 is fitted to reciprocate in a barrel 22, which is narrower than the cylinder 16. The lower end of the barrel 22 is fitted into the upper end of the cylinder 16, and a connection is made between the two in any desired manner. The upper end of the barrel 22 is in communication with the tank 5 or some other source of pressure, as by the use of the elbow connection 23, making a joint with a neck 24 of the tank.

The valve 12 is connected with a valve stem 25 mounted to reciprocate through the passage 17 and through a stuffing box 26. A yoke 27 on the outer end of the valve stem 25 engages a head 28 of the quadrant 29 pivoted at 30 upon a suitable supporting frame work 31. The lower portion of the quadrant 29 is constructed with two faces 32 and 33, which are preferably straight faces meeting at an obtuse angle centrally of the quadrant and converging downwardly.

These faces are adapted to be engaged by a roller 34 carried upon the operating lever 35. This operating lever has a fulcrum support upon the knife edges 36 engaging with the upper portion of the framework 31. A coil spring 37 surrounds the lever 35 and exerts an expanding pressure against the knife edge 36 and against a collar 38, which is secured upon the lever as by the use of a pin 39. A bow or other spring 40 is employed to hold the lever 35 yieldably in the position shown in Figure 1. The bow spring may be fixed, as indicated at 41', at one of its ends upon the supporting frame 31, and at its other end, it is provided with a yoke 42', in which is disposed a roller 43' bearing upon the lever 35. The free end portions of the yoke extend upon opposite sides of the lever 35 for holding the same slidably in place. A stud or boss 44' engages the spring 40 adjacent the anchoring point 41', and the spring is bowed from the stud or boss 44' to the yoke 42', and in its expanding action, it reacts against the stud 44', which acts as an abutment.

The lever is provided with a block 41 having a bevelled face 42 to cooperate with the bevel nose 43 of the latch 44. This latch is pivoted at 45 and is provided with a notch 46 to engage the block 41. A pin 47 on the lower end of the rod 48 is adapted to engage the tail piece of the latch 44 for the purpose of disengaging the same.

The rod 48 is disposed parallel with the cylinder 16 and has a trip finger 49 at its upper end in the path of the lug 50 carried by the plunger rod 20, which projects out through a slot 51 in the cylinder 16. A coil spring 52 is wound about the rod 48 and abuts against a collar 53 on the frame 31 and a pin just above collar 54, which pin is carried by the rod 48, whereby the spring 52 normally urges the rod 48 downwardly.

In the use of the device, the parts are normally in the position shown in Figure 1, where the valve 12 is closed against the seat 13, and is away from the seat 14. No liquid from the tank will be allowed to enter the cylinder 16. The liquid from the tank or other source of pressure, however, will flow through the elbow 23 and into the upper end of the barrel 22 forcing the plungers 21 and 19 downwardly to the lower position shown in Figure 1. The springs 37 and 40 will tend to hold the parts in this position until forcibly actuated as by grasping the lever 35 and moving it to the position indicated in Figure 2, which is accomplished whenever delivery of a measured quantity of liquid from the tank 5 is desired. For instance, the roller 34 passes the center of the quadrant 29 and rides on the opposite straight face 33, thus oscillating the quadrant 29 and pulling the valve 12 away from the seat 13 and against the opposite seat 14. Liquid immediately begins to flow through the nipple 7 and port 15 into the lower end of the cylinder 16. Owing to the differential diameter of the two pistons, this incoming liquid beneath the larger piston will tend to raise the pistons 19 and 21 until the lug 50 encounters the finger 49, whereupon the rod 48 will be lifted to trip the latch 44.

It will be understood that this latch has engaged with the block 41 of the lever, as shown in Figure 2, as soon as the lever has been thrown over by hand to insure the parts remaining in the thrown position, until the full amount of liquid bargained for has entered the cylinder 16. As soon as the latch is tripped, the bow spring 40 will return the lever 35 to the position shown in Figure 1, again rocking the quadrant 49 back to the initial position and restoring the rod 12 to the closed position against the seat 13; but, at the same time, opening the passage 17 and the vent 18, whereby the measured quantity of the liquid in the cylinder 16 may flow out and be caught in a container. The spring 37, cooperating with the faces 32 and 33 of the quadrant, will tend to hold the lever 35 in the position to which shifted. The lever 35 has a movement longitudinally through the spring 37, and this spring will exert an expansive force against the knife edge block 36 to hold the lever to one side or the other until forcibly shifted in the opposite direction. When the valve 12 is in the position shown in Figure 1, the tank pressure is only upon the upper smaller piston 21, while the lower larger piston 19 is at atmospheric pressure, and consequently, the pistons will be driven down by gravity and the tank pressure, and they will act to force the liquid out of the lower end of the cylinder 16.

When the lug 50 reaches the trip finger 49, the piston 19 will have moved through a full stroke, admitting a predetermined quantity of the liquid into the cylinder 16. At this time, the rod 48 will be raised, tripping the latch 44 and releasing the lever 35; whereupon, the bow spring 40 will return the lever to the position shown in Figure 1, shifting the valve 12 back to the seat 13 and away from the seat 14. The liquid will then be permitted to flow out through the vent 18, as the pistons descend in the cylinder and barrel.

It will be obvious that many changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. In an automatic liquid measuring device, the combination with a tank or vessel for liquid, of a measuring device in communication with the tank pressure and with the atmosphere, a valve disposed in one position to cut off the communication of the tank pressure with the measuring device, and in the other position to cut off the communication with the atmosphere, means for moving said valve, and means actuated by the measuring device for restoring said valve to initial position.

2. In an automatic liquid measuring device, a measuring device in communication with a source of liquid supply and with the atmosphere, a reciprocating valve for alternately controlling such communication, a lever for manipulating said valve, means for yieldably shifting said lever to one position, means for latching the lever in the opposite position, and tripping means for the latching means operable by said measuring device.

3. In an automatic liquid measuring device, a measuring device in communication with a source of liquid supply and with the atmosphere, a valve for alternately controlling said communication, a pivoted quadrant coupled to actuate said valve, a lever having a roller moving over said quadrant, yieldable means for shifting said lever to an initial position with the liquid supply cut off, a latch for holding the lever in the opposite position with the liquid supply open and the atmosphere cut off, and tripping means carried by the measuring device for releasing the latch on receipt of a predetermined quantity of liquid.

4. In an automatic liquid measuring device, a measuring device in communication with a source of liquid supply and with the atmosphere, a valve for controlling such communication, a pivoted quadrant coupled to said valve and having intesecting sloping faces, a lever having a roller slidable on said faces of the quadrant, said lever being slidable longitudinally in moving over said quadrant, a fixed fulcrum for the lever, resilient means connected to said slidable lever and to the fixed fulcrum, a bow spring for yieldably retaining said lever in an initial position, a latch for holding the lever in the thrown position, and tripping means for the latch actuated by said measuring device.

5. In an automatic liquid measuring device, the combination with a tank under pressure, of a cylinder in communication at its lower end with the tank, a barrel of smaller diameter than the cylinder in communication with the tank pressure at its upper end, coupled pistons of differential diameter in said cylinder and barrel, a base for the cylinder having a vent to the atmosphere, a valve in the base for controlling the vent and for controlling the admittance of liquid to the cylinder, and operating means for said valve.

BENJAMIN H. DUPUY.